US007669433B2

(12) United States Patent
Yoon et al.

(10) Patent No.: US 7,669,433 B2
(45) Date of Patent: Mar. 2, 2010

(54) MULTI-AIR CONDITIONER CENTRAL CONTROL SYSTEM

(75) Inventors: Young Soo Yoon, Seoul (KR); Sang Chul Youn, Seoul (KR); Duck Gu Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 732 days.

(21) Appl. No.: 11/341,621

(22) Filed: Jan. 30, 2006

(65) Prior Publication Data

US 2006/0287774 A1 Dec. 21, 2006

(30) Foreign Application Priority Data

Feb. 24, 2005 (KR) ...................... 10-2005-0015357

(51) Int. Cl.
F25B 19/00 (2006.01)

(52) U.S. Cl. .......................................... 62/231; 62/186

(58) Field of Classification Search .................. 62/126, 62/186, 231, 127, 129, 132, 175, 176.6, 259.1; 700/276, 275; 236/49.3
See application file for complete search history.

(56) References Cited

U.S. PATENT DOCUMENTS

| 5,317,907 | A | * | 6/1994 | Shimizu et al. | ............ 62/176.6 |
| 5,323,617 | A | * | 6/1994 | Ichikawa | ...................... 62/129 |
| 5,435,147 | A | * | 7/1995 | Mochizuki et al. | ............ 62/175 |
| 5,642,857 | A | * | 7/1997 | Totsuka et al. | ................ 62/175 |
| 5,647,223 | A | * | 7/1997 | Wada et al. | .................... 62/175 |
| 5,927,093 | A | * | 7/1999 | Noguchi et al. | ............ 62/259.1 |
| 6,098,413 | A | * | 8/2000 | Wada | ........................... 62/127 |
| 6,126,080 | A | * | 10/2000 | Wada | ........................... 62/175 |
| 6,405,103 | B1 | * | 6/2002 | Ryan et al. | ................... 700/275 |
| 6,848,623 | B2 | * | 2/2005 | Weimer et al. | ............. 236/49.3 |
| 6,865,898 | B2 | * | 3/2005 | Yamanashi et al. | ............ 62/132 |
| 6,978,627 | B2 | * | 12/2005 | Masui et al. | ................... 62/127 |
| 7,062,927 | B2 | * | 6/2006 | Kwon et al. | ................... 62/126 |
| 7,082,353 | B2 | * | 7/2006 | Kwon et al. | ................ 700/277 |
| 7,204,093 | B2 | * | 4/2007 | Kwon et al. | ................... 62/157 |
| 7,216,017 | B2 | * | 5/2007 | Kwon et al. | ................ 700/276 |
| 7,287,393 | B2 | * | 10/2007 | Kwon et al. | ................... 62/157 |
| 7,340,909 | B2 | * | 3/2008 | Kwon et al. | ................... 62/175 |

(Continued)

FOREIGN PATENT DOCUMENTS

JP 2004184067 A * 7/2004

OTHER PUBLICATIONS

U.S. Appl. No. 11/341,620 to Jung et al., filed on Jan. 30, 2006.

*Primary Examiner*—Ljiljana (Lil) V Ciric
(74) *Attorney, Agent, or Firm*—Birch, Stewart, Kolasch & Birch, LLP

(57) ABSTRACT

Provided is a multi-air conditioner central control system, which shares the physical network and control resources with a multi-air conditioner system so as to control a ventilation system in an integrated manner. The central control system includes a multi-air conditioner system including one or more multi-air conditioners connected to a network for indoor air conditioning, a ventilation system including one or more ventilation devices connected to the network for ventilating indoor air by inhaling and exhausting the indoor air, and a central controller connected with the multi-air conditioner system and the ventilation system for monitoring, in real time, a state of each of the multi-air conditioners and the ventilation devices and controlling an operation thereof.

7 Claims, 5 Drawing Sheets

U.S. PATENT DOCUMENTS

2003/0140637 A1 * 7/2003 Masui et al. .................. 62/127
2004/0117069 A1   6/2004 Yoon et al.
2005/0204758 A1   9/2005 Kwon et al.

* cited by examiner

MULTI-AIR CONDITIONER CENTRAL CONTROL SYSTEM

BACKGROUND OF THE INVENTION

1. Field of the Invention

The present invention relates to a multi-air conditioner central control system, and more particularly to a multi-air conditioner central control system wherein a multi-air conditioner system including a plurality of multi-air conditioners and a ventilation system including a plurality of ventilation devices are constructed to share a physical network and control resources with each other such that the multi-air conditioners and the ventilation devices can be controlled in an integrated manner.

2. Description of the Related Art

Recently, air conditioners have entered into widespread use. According to such a trend, a multi-type air conditioner has been developed and made commercially available which includes two or more indoor units installed in individual rooms of a home or individual offices of a building, and an outdoor unit connected in common with the indoor units. A plurality of such multi-type air conditioners typically constitute a multi-air conditioner system.

FIG. 1 is a block diagram showing the configuration of a conventional multi-air conditioner central control system.

The conventional multi-air conditioner central control system comprises, as shown in FIG. 1, a multi-air conditioner system 20 including a plurality of indoor units 22 installed in individual rooms and a plurality of outdoor units 21 each of which is connected in common with associated ones of the indoor units 22 to control the flow of a coolant therethrough. The central control system also comprises a central controller 10 which is connected with the outdoor units 21 via a network so as to control the multi-air conditioner system 20 in an integrated manner.

Each of the outdoor units 21 takes charge of two or more indoor units 22 to control the circulation of a coolant through the associated indoor units 22. If an operation command is inputted to one of the indoor units, the associated outdoor unit connected with the indoor unit determines which indoor unit has received what kind of commands and adjusts the amount of coolant condensation to perform a cooling or heating operation in compliance with the inputted operation command.

The central controller 10 collects, through the outdoor units 21 over the network, state information data regarding the outdoor units 21 and the indoor units 22 connected to the associated outdoor units 21. The central controller 10 monitors operation states of the entire multi-air conditioner system 20 connected via the network, and sends a desired control command on the basis of monitoring results to a corresponding one of the indoor or outdoor units 22 or 21, which is requested to execute the control command.

On the other hand, owing to dense and high-rise buildings and aggravated air pollution, there is an increasing need to construct a ventilation system 30, together with the multi-air conditioner system 20, for continuously replacing polluted indoor air with fresh outdoor air.

The ventilation system 30 includes a plurality of ventilation devices. The ventilation devices are classified into master ventilation devices 31 and slave ventilation devices 32. One or more of the slave ventilation devices are connected to an associated device assigned as their master ventilation device, thereby forming a localized network. The connected slave ventilation devices perform the same operation in sync with the operation of their master ventilation device.

However, the conventional ventilation system has a limitation in that each of the master ventilation devices and its associated slave ventilation devices forms a localized network, but the master ventilation devices are not networked for integrated control.

To construct a central control system for the conventional ventilation system through a network interconnecting the master ventilation devices, there is another problem in that a separate central control system apart from the existing multi-air conditioner central control system has to be constructed, imposing a heavy cost burden.

Moreover, if a separate central control system of the ventilation system is constructed, there is a further problem in that operation controls such as power management must be separately performed for the multi-air conditioner system and the ventilation system coexisting in one building, degrading overall operation efficiency.

SUMMARY OF THE INVENTION

Accordingly, the present invention has been made in view of the above problems, and it is an object of the present invention to provide a multi-air conditioner central control system. A system of multi-air conditioners shares its physical network and control resources with a system of ventilation devices such that the ventilation devices as well as the multi-air conditioners can be controlled in an integrated manner.

In accordance with the present invention, the above and other objects can be accomplished by the provision of a multi-air conditioner central control system. The central control system comprises a multi-air conditioner system which includes one or more multi-air conditioners connected to a network for performing indoor air conditioning. The central control system also comprises a ventilation system which includes one or more ventilation devices connected to the network for ventilating indoor air by inhaling and exhausting the indoor air. The central control system further comprises a central controller which is connected with both the multi-air conditioner system and the ventilation system to monitor, in real time, a state of each of the multi-air conditioners and the ventilation devices and control operation thereof.

Preferably, the multi-air conditioner system and the ventilation system are networked via an RS-485 based communication protocol.

Preferably, a control unit of the central controller includes a multi-air conditioner controller which monitors operation states of outdoor units and indoor units constituting each of the multi-air conditioners, and generates a control signal corresponding to the control command received from a UI unit and transmitting the control signal to an associated one of the multi-air conditioners so that the associated multi-air conditioner is operated according to the control command. The control unit also includes a ventilation device controller which monitors operation states of master ventilation devices constituting the ventilation system, and operates slave ventilation devices connected to an associated one of the master ventilation devices according to a control command signal received by the associated master ventilation device and sent by the UI unit.

According to the present invention, the multi-air conditioner central control system shares the physical network and control resources with a central control system of the multi-air conditioner system to control the ventilation system in an integrated manner. Thus, each operation of the multi-air conditioning facilities installed throughout the building can be rapidly and efficiently controlled via the single central control system.

Moreover, for central control of the ventilation system, there is no need to equip an additional network and controller. Consequently, additional system construction costs are minimized, and system development and installation time for multi-air conditioning facilities can be greatly reduced.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
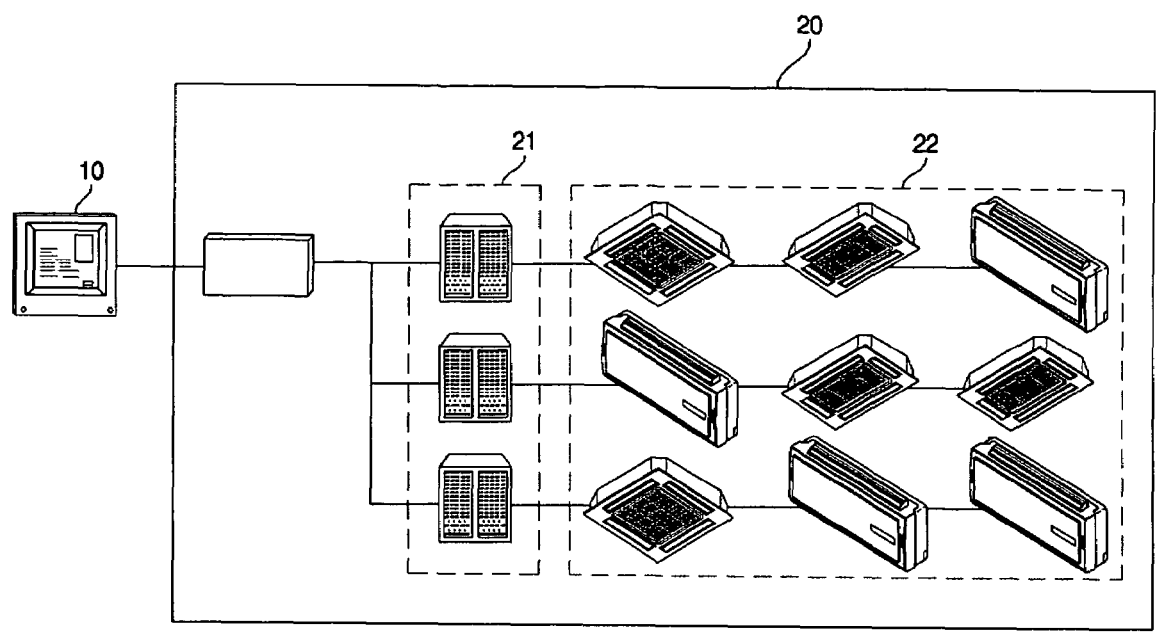
FIG. 1 is a schematic block diagram showing the configuration of a conventional multi-air conditioner central control system.
Figure 1:
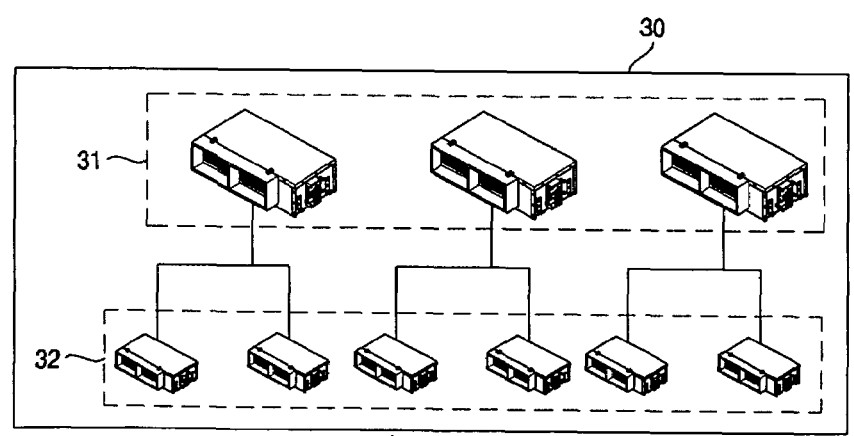
Figure 2:
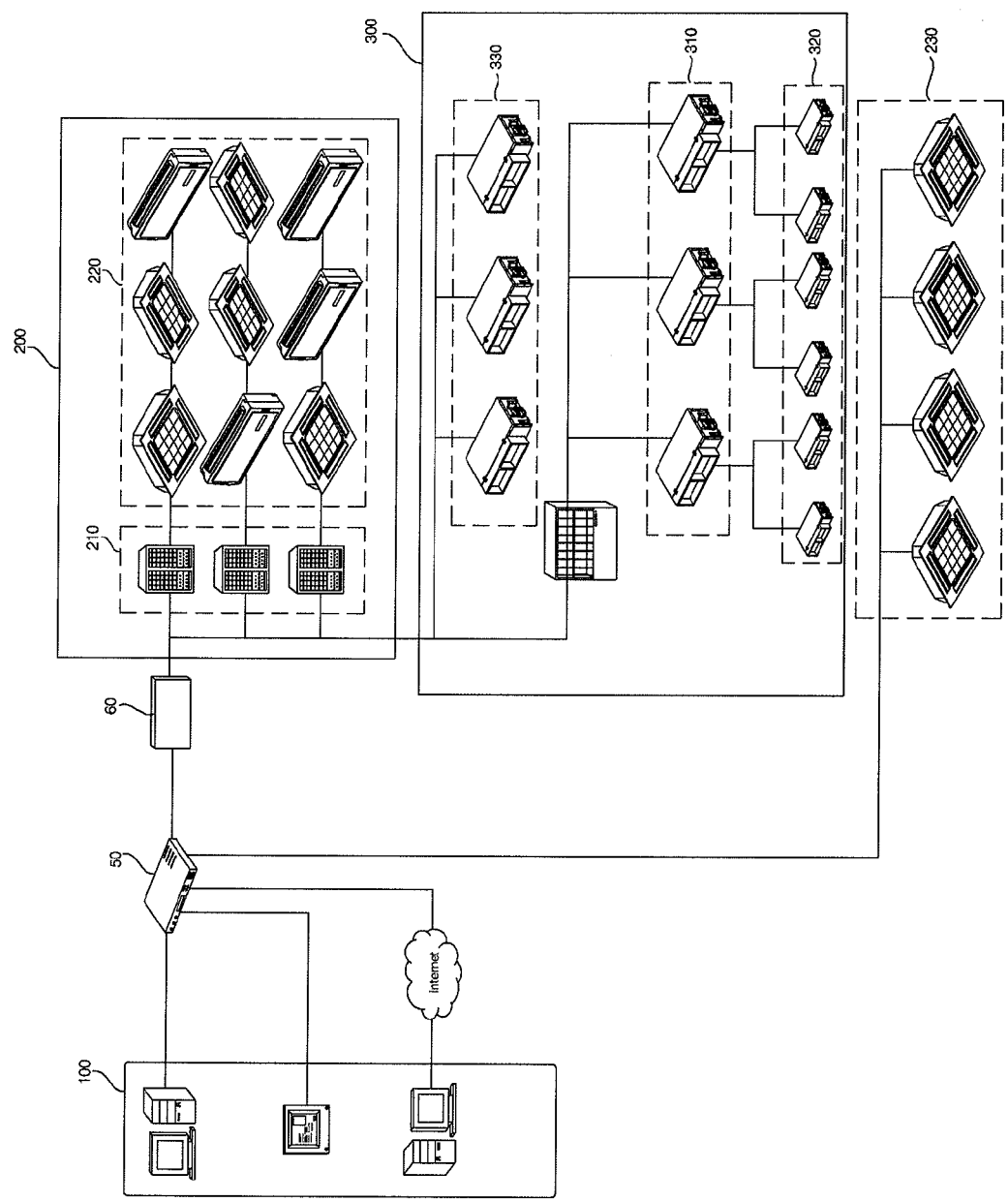
FIG. 2 is a block diagram showing the configuration of a multi-air conditioner central control system according to the present invention.

FIG. 2 is a block diagram showing the configuration of a multi-air conditioner central control system according to the present invention.

The multi-air conditioner central control system according to the present invention comprises a multi-air conditioner system 200 including a plurality of outdoor units 210 and indoor units 220, a ventilation system 300 including a plurality of ventilation devices 310 and 320. The central control system also comprises a central controller 100 which is connected via a network with the multi-air conditioner system 200 and the ventilation system 300 so as to control operations of the above equipment in an integrated manner.

The multi-air conditioner system 200 comprises a multi-air conditioner whose outdoor unit 210 is connected in common with two or more associated ones of the indoor units 220. The multi-air conditioner system 200 provides sufficient cooling and heating capacity for the building. Not only can each of the indoor units installed in a room be separately controlled, but also the entire multi-air conditioner system 200 in the building can be centrally controlled through the central controller 100 disposed at a predetermined site.

The indoor units 220 constituting the multi-air conditioner may be any of ceiling mounted type, wall mounted type, and stand type. Each of the outdoor units 210 connected with the associated indoor units 220 controls the circulation of a coolant therethrough to perform an air conditioning function in each room according to an operation control command sent from the central controller or an associated indoor unit.

The ventilation system 300 according to the present invention includes a plurality of the ventilation devices 310 and 320 for circulating air by exchanging the air in the spaces where the ventilation devices 310 and 320 are installed with outdoor air. The ventilation system 300 further includes sensors (not shown) for sensing pollution levels of air in the spaces where the ventilation devices 310 and 320 are installed.

The ventilation devices 310 and 320 include exhaust ducts for inhaling indoor air and exhausting the indoor air to the outside, inhalation ducts for inhaling outdoor air and exhausting the outdoor air internally, and inhalation and exhaust openings provided to each of the inhalation and exhaust ducts. The inhalation and exhaust ducts are operated to circulate the air according to device controllers (not shown) installed in the ventilation devices 310 and 320.

The ventilation devices 310 and 320 can be classified into master and slave ventilation devices by a setting. Slave ventilation devices 320 connected to an associated master ventilation device 310 perform an operation in unison with an operation of the associated master ventilation device 310.

The master ventilation devices 310 not only perform a ventilation operation on the basis of data sent from the sensors but also send a corresponding command to the connected slave ventilation devices 320, which are adapted to automatically perform a needed ventilation operation according to the command.

The central controller 100 is a device for controlling, in an integrated manner, the multi-air conditioner system 200 and the ventilation system 300 linked via a network. The central controller 100 is connected with the outdoor units 210 of the multi-air conditioner system 200 and the master ventilation devices 310 of the ventilation system 300, and can create a control command and send it thereto.

The central controller 100 can be directly connected with a multi-air conditioning apparatus (200 and 300) comprising the multi-air conditioner system 200 and the ventilation system 300, and be adapted to control the multi-air conditioning apparatus (200 and 300). With a hub 50 or an IP sharing device, the central controller 100 can remotely control an operation of the multi-air conditioning apparatus (200 and 300) via the Internet. In addition, the central controller 100 can be a multi-station device depending upon the type thereof.

The multi-air conditioning apparatus (200 and 300) performs data transmission and reception operations through an RS-485 based communication protocol. In the case that the central controller 100 is not directly connected with the multi-air conditioning apparatus (200 and 300), the multi-air conditioning apparatus (200 and 300) may comprise a protocol converter 60 which performs translation between data compliant with the central controller 100 and data compliant with the RS-485 communication protocol, hence the central controller 100 can send data to and receive data from the outdoor and indoor units 210 and 220 and the ventilation devices 310 and 320 through the protocol converter 60.

Figure 3:
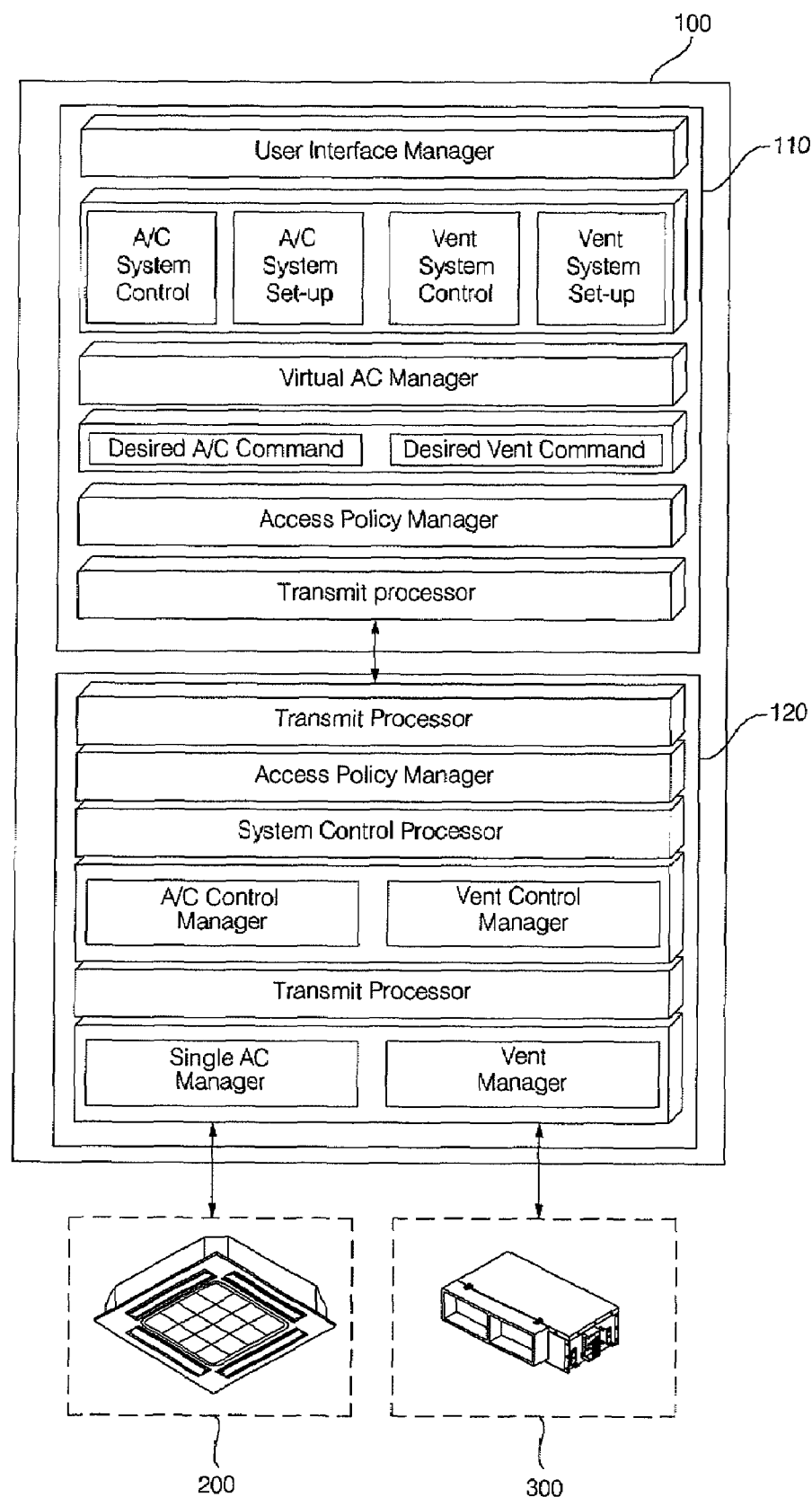
FIG. 3 is a block diagram showing the integrated control structure of a central controller according to the present invention.

FIG. 3 is a block diagram showing the integrated control structure of the central controller according to the present invention.

The central controller 100 according to the present invention is physically similar to a central controller of an existing multi-air conditioner central control system. In the central controller 100, control resources of the existing central controller are shared such that the ventilation system 300 can also be controlled. Consequently, the central controller 100 as a single central controller can control, in an integrated manner, the multi-air conditioner system and the ventilation system in the entire building.

The central controller 100 includes a driving control engine 120 for controlling the multi-air conditioner system 200 and the ventilation system 300 by data transmission and reception operations. The central controller 100 also includes a graphic user interface (GUI) 110 through which the manager of the multi-air conditioning apparatus (200 and 300) inputs an operation command thereto and monitors a result therefrom corresponding to the operation command.

Figure 4:
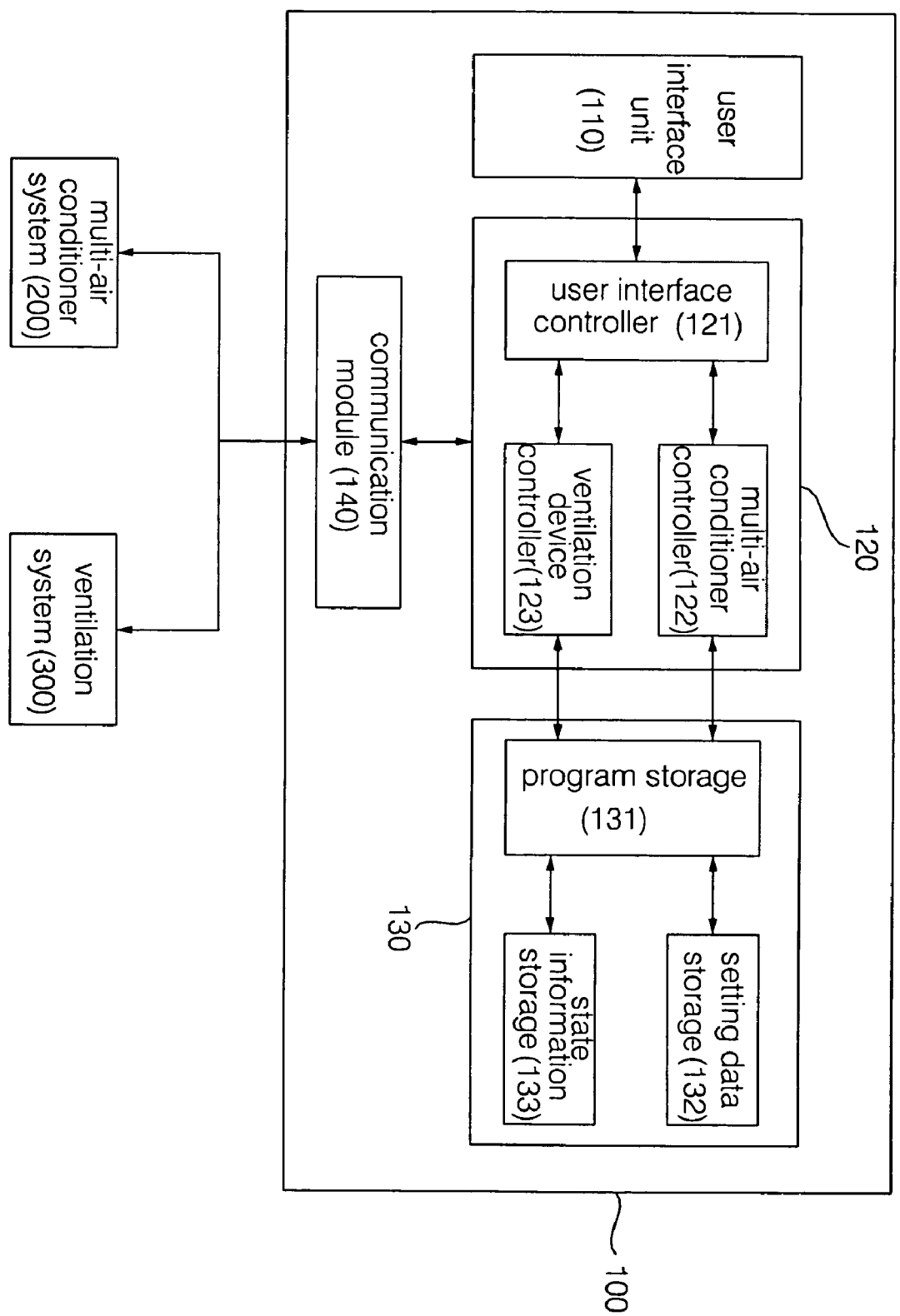
FIG. 4 is a block diagram showing the internal configuration of the central controller according to the present invention.

FIG. 4 is a block diagram showing the internal configuration of the central controller according to the present invention.

The central controller 100 includes a control unit 120 and a user interface (UI) unit 110 corresponding to the driving control engine and the GUI of FIG. 3, respectively.

The UI unit 110 is used to display state information regarding operations of the multi-air conditioner system 200 and the ventilation system 300 and the network interconnecting them, and input a control command for operation control on the basis of the displayed state information.

The control unit 120 generates and transmits a control signal corresponding to the inputted control command for controlling an associated multi-air conditioner or an associated ventilation device.

The central controller 100 further includes a database 130 for storing control programs to operate the control unit 120, the control command inputted from the UI unit 110, and the state information regarding the associated multi-air conditioner and the associated ventilation device. The central controller 100 further includes a communication module 140 for sending and receiving data via the network. The communication module 140 can be one of various types according to networking schemes used to connect the central controller 100 to the multi-air conditioning apparatus (200 and 300).

The database 130 includes a program storage 131 for storing the control programs, a setting data storage 132 for storing setting data inputted from the UI unit 110 regarding each multi-air conditioner or each ventilation device, and a state information storage 133 for storing data resulting from associated operation execution of each multi-air conditioner or each ventilation device according to the control command sent from the UI unit 110.

The control programs are a kind of operating system and software running on top of the operating system for driving physical resources constituting the central controller 100 to control the multi-air conditioning apparatus (200 and 300) in an integrated manner. The control programs include a main control program for controlling an overall operation of the central controller 100, and application control programs for controlling operations of the multi-air conditioner system 200 and the ventilation system 300 on top of the main control program.

The control unit 120 includes a multi-air conditioner controller 122 for controlling operation of the multi-air conditioner system 200, and a ventilation device controller 123 for controlling operation of the ventilation system 300 on the basis of sensing results from the sensor. The control unit 120 also includes a UI controller for supporting the UI unit 110 to independently output state information data regarding each multi-air conditioner or each ventilation device and to separately input control commands on the basis of the state information data.

The multi-air conditioner controller 122 monitors operation states of associated outdoor and indoor units 210 and 220 constituting each multi-air conditioner, generates a control signal corresponding to the control command received from the UI unit 110 and transmits the control signal to the associated multi-air conditioner so as to operate the associated multi-air conditioner according to the control command. The ventilation device controller 123, like the multi-air conditioner controller 122, monitors operation states of master ventilation devices, generates a control signal corresponding to the control command received from the UI unit and transmits the control signal to an associated master ventilation device so as to operate the slave ventilation devices connected to the associated master ventilation device according to the control command.

The control unit 120 applies various control functions already having been performed by existing multi-air conditioner central control systems to the ventilation system 300 such that the ventilation device controller 123 can perform functions similar to those of the multi-air conditioner controller 122 using the application control programs stored in the program storage.

For example, if the application control programs include a peak power control program which performs peak power control when current power consumption of each of the multi-air conditioners and ventilation devices exceeds a predetermined managerial power level, the peak power control can be selectively enforced for the multi-air conditioner system 200, the ventilation system 200, or the multi-air conditioning apparatus (200 and 300).

If the application control programs include a schedule control program which schedules operations of the multi-air conditioners and the ventilation devices on the basis of an inputted operation schedule, the operations of the multi-air conditioning apparatus (200 and 300) can be controlled according to the schedule inputted via the UI unit 110 or an automatically set schedule.

If the application control programs include an integral power consumption control program which distributes measured integral power consumption into the multi-air conditioners and the ventilation devices, the integral power consumption of the multi-air conditioning apparatus (200 and 300) can be controlled on the basis of an inputted managerial integral power consumption level. In addition, electricity demand control and failure history management can be applied in a similar way.

Accordingly, the central controller can control the multi-air conditioning apparatus (200 and 300) in various ways according to one of the application control programs.

The multi-air conditioner central control system according to the present invention can be applied in various forms depending upon the application size or purpose.

Figure 5:
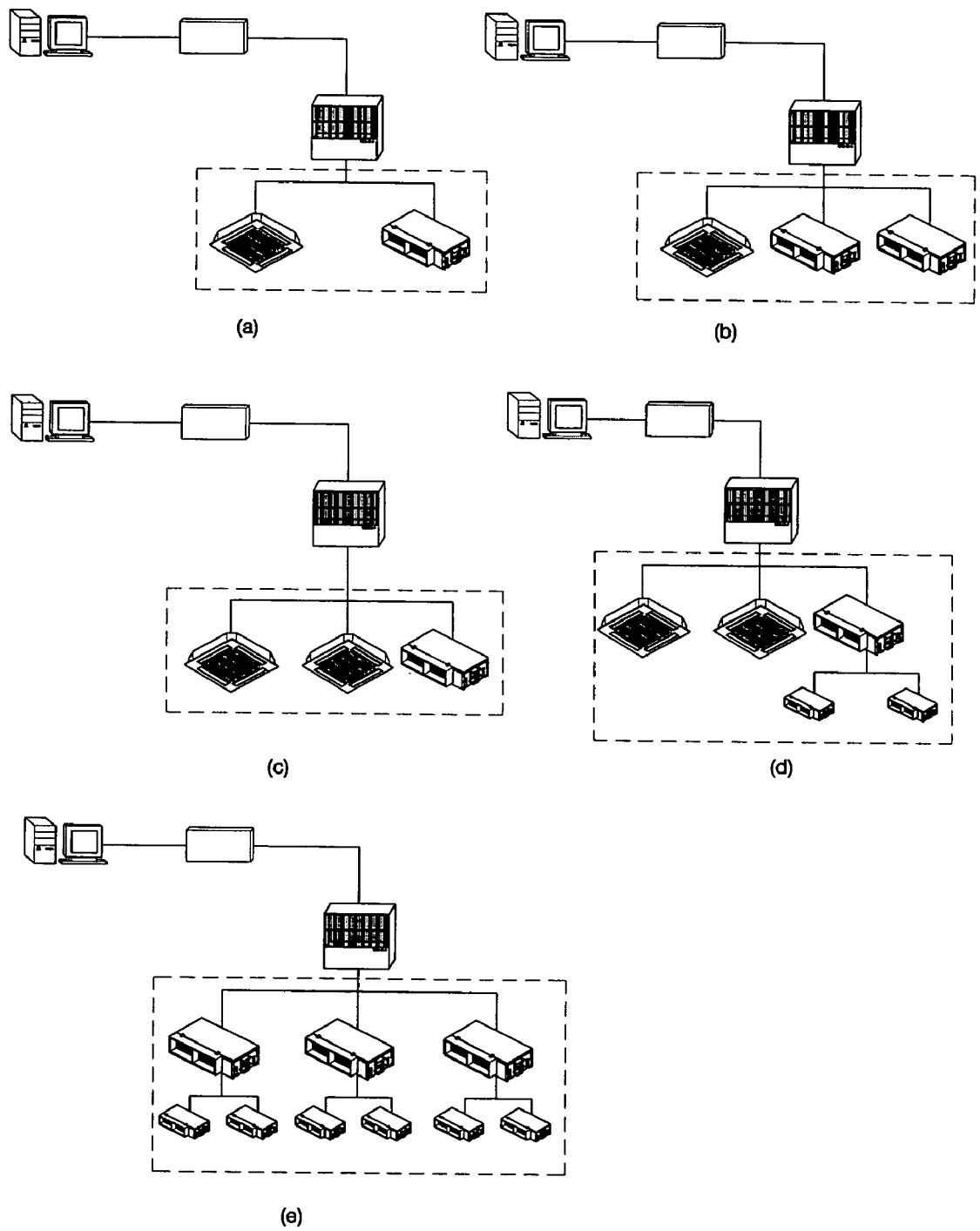
FIGS. 5a to 5e are block diagrams showing various embodiments of the multi-air conditioner central control system according to the present invention.

FIGS. 5a to 5e are block diagrams illustrating various embodiments of the multi-air conditioner central control system according to the present invention. A small-sized embodiment of the multi-air conditioning apparatus (200 and 300) can be constructed to include one indoor unit and one ventilation device connected to each other, as shown in FIG. 5a. The number of the indoor units or ventilation devices connected to one another can be increased, as shown in FIGS. 5b and 5c. A large-sized embodiment can be constructed to include multiple indoor units and multiple master/slave ventilation devices connected to one another, as shown in FIG. 5d.

Even in a ventilation device-only embodiment in which only multiple ventilation devices are connected to one another without any indoor unit, as shown in FIG. 5e, the ventilation system can be controlled in an integrated manner because of the substantially identical control scheme and structure due to the sharing of the physical resources.

According to the present invention, the multi-air conditioner central control system shares the physical network and control resources with a central control system of the multi-air conditioner system to control the ventilation system in an integrated manner. Thus, each operation of the multi-air conditioning apparatus installed throughout the building can be rapidly and efficiently controlled via the single central control system.

Moreover, for central control of the ventilation system, there is no need to equip an additional network and controller. Consequently, additional system construction costs are minimized and system development and installation time for multi-air conditioning facilities can be greatly reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A multi-air conditioner central control system, comprising:
   a multi-air conditioner system for performing indoor air conditioning, the multi-air conditioner system including one or more multi-air conditioners connected to a network, each of the one or more multi-air conditioners comprising an outdoor unit and at least one indoor unit;
   a ventilation system for ventilating indoor air by inhaling and exhausting the indoor air without performing heat exchanging, the ventilation system including one or more ventilation devices connected to the network; and
   a central controller connected with both the multi-air conditioner system and the ventilation system, the central controller monitoring in real time a state of each of the one or more multi-air conditioners and the one or more ventilation devices and controlling an operation,
   wherein the central controller schedules operations of each of the one or more multi-air conditioners and the one or more ventilation devices on the basis of an inputted operation schedule.

2. The multi-air conditioner central control system as set forth in claim 1, wherein the central controller includes:
   a user interface unit for outputting state information data regarding each of the one or more multi-air conditioners and the one or more ventilation devices and network connection, and for inputting a control command to control the operation; and
   a control unit for controlling an associated one of the one or more multi-air conditioners and the one or more ventilation devices according to the control command.

3. The multi-air conditioner central control system as set forth in claim 2, wherein the central controller further includes:
   a program storage for storing control programs to control an operation of the control unit;
   a setting data storage for storing setting data inputted from the user interface unit regarding each of the one or more multi-air conditioners and the one or more ventilation devices; and
   a state information storage for storing a state information data resulting from operation execution of the associated one of the one or more multi-air conditioners and the one or more ventilation devices according to the control command.

4. The multi-air conditioner central control system as set forth in claim 1, wherein the central controller performs an individual peak power control when current power consumption of each of the one or more multi-air conditioners and the one or more ventilation devices exceeds a predetermined managerial power level.

5. The multi-air conditioner central control system as set forth in claim 1, wherein the central controller distributes integral power consumption accumulated during operation of the one ore more multi-air conditioners and the one or more ventilation devices into the multi-air conditioners and ventilation devices.

6. The multi-air conditioner central control system as set forth in claim 2, wherein the one or more ventilation devices comprise master ventilation devices and slave ventilation devices connected to an associated one of the master ventilation devices,
   wherein the control unit includes a multi-air conditioner controller for monitoring operation states of the outdoor unit and indoor unit constituting the one or more multi-air conditioners, and generating a control signal corresponding to the control command inputted from the user interface unit and transmitting the control signal to an associated one of the one or more multi-air conditioners; and
   a ventilation device controller for monitoring operation states of the master ventilation devices, and operating the slave ventilation devices on the basis of the control command inputted from the user interface unit.

7. The multi-air conditioner central control system as set forth in claim 2, wherein the control unit further includes a user interface controller for supporting the user interface unit to independently output state information data regarding each of the one or more multi-air conditioners and the one or more ventilation devices and to separately input the control command.

* * * * *